United States Patent [19]
Perkins, Jr.

[11] Patent Number: 6,049,965
[45] Date of Patent: *Apr. 18, 2000

[54] METHOD AND APPARATUS FOR MACHINING A WORKPIECE

[75] Inventor: Derrick Perkins, Jr., South Hamilton, Mass.

[73] Assignee: Liberty Research Company, Inc., Gonic, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,028

[22] Filed: Jul. 31, 1997

[51] Int. Cl.$^7$ ................................................ B23P 13/04
[52] U.S. Cl. .............................. 29/558; 29/874; 29/27 R; 439/565
[58] Field of Search ................................. 29/558, 27 R, 29/27 C, 874; 439/562, 564, 565, 569

[56] References Cited

U.S. PATENT DOCUMENTS

| | | | |
|---|---|---|---|
| 3,597,716 | 8/1971 | Stuart et al. | 339/19 |
| 3,646,502 | 2/1972 | Hutter et al. | 29/629 |
| 3,710,466 | 1/1973 | Williamson et al. | 29/27 R |
| 3,786,539 | 1/1974 | Foll et al. | 29/27 C |
| 3,833,312 | 9/1974 | Miles et al. | 408/42 |
| 3,955,257 | 5/1976 | Herbst et al. | 29/36 |
| 4,162,134 | 7/1979 | Kitagawa | 408/46 |
| 4,278,374 | 7/1981 | Wolosianski | 409/74 |
| 4,508,413 | 4/1985 | Bailey | 339/129 |
| 4,524,654 | 6/1985 | Lucey | 82/3 |
| 4,558,419 | 12/1985 | Kanematsu et al. | 364/474 |
| 4,700,594 | 10/1987 | Heinen | 82/3 |
| 4,764,127 | 8/1988 | Price | 439/565 |
| 4,777,713 | 10/1988 | Kitamura | 29/27 C |
| 4,788,481 | 11/1988 | Niwa | 318/600 |
| 4,872,788 | 10/1989 | Koese | 408/46 |
| 4,915,549 | 4/1990 | Riddell | 408/43 |
| 4,995,837 | 2/1991 | Couper et al. | 439/863 |
| 5,282,300 | 2/1994 | Girny et al. | 29/27 C |
| 5,603,590 | 2/1997 | Wozar | 408/31 |
| 5,619,894 | 4/1997 | Habegger | 82/129 |

FOREIGN PATENT DOCUMENTS

| | | | |
|---|---|---|---|
| 402224903 | 9/1990 | Japan | 29/27 C |
| 403245929 | 11/1991 | Japan | 29/27 R |

OTHER PUBLICATIONS

McGraw–Hill Encyclopedia of Science & Technology, vol. 7, 5$^{th}$ Edition, 1982, *Lathe* entry, pp. 566, 567.

*Primary Examiner*—David P. Bryant
*Assistant Examiner*—Jermie E. Cozart
*Attorney, Agent, or Firm*—Hamilton, Brook, Smith & Reynolds, P.C.

[57] ABSTRACT

A multi-head machine tool for machining a workpiece into an article has a head that holds a workpiece and that rotates the workpiece. A multi-head tool attachment is capable of machining a plurality of working sites on the workpiece during rotation of the workpiece simultaneously.

9 Claims, 7 Drawing Sheets

METHOD AND APPARATUS FOR MACHINING A WORKPIECE

BACKGROUND OF THE INVENTION

In the manufacturing of machined components in high volume, it is desirable to make them more efficiently at equal or higher quality. In trying to make the components more efficiently, and cost effectively, it has been recognized that the fewer individual components required and the fewer machines on which each component has to be installed for machining will typically aid in achieving those objectives.

One machine which allows for the completion of numerous machining processes is a multi-spindle lathe. The multi-spindle lathe has numerous stations, typically six or eight, upon which various operations can be performed to produce a part. Typically, each slide of each station performs a single cutting operation at any one time.

A continuing need exists for improvements, however, in the efficiency and accuracy of machining methods in the fabrication of components for various applications.

SUMMARY OF THE INVENTION

The invention relates generally to a multi-head machine tool for machining a workpiece into an article. The multi-head machine tool has a head that holds a workpiece and that rotates the workpiece. A multi-head tool attachment machines a plurality of working sites on the workpiece during rotation of the workpiece.

In a preferred embodiment, a drill attachment has an outer sleeve and an inner sleeve that rotates relative to the outer sleeve. A drive shaft connects to a rotating shaft of a lathe, and is positioned along a longitudinal axis of the drill attachment. A first drive mechanism is interposed between the drive shaft and the inner sleeve. The first drive mechanism couples the rotational motion of the draft shaft to the inner sleeve. A drill head is carried by the inner sleeve and extending parallel to and spaced from the longitudinal axis. A drill bit extends longitudinally from the drill head. A second drive mechanism is connected to the drive shaft for rotating the drill bit relative to the drill head.

A preferred embodiment of invention relates to a method and apparatus for manufacturing a part having at least one hole spaced from and parallel to a center line of the part using a lathe, and in a preferred embodiment a multi-spindle lathe. The drill attachment of the lathe has an outer sleeve, an inner sleeve as described above. The drill attachment has additional drill heads carried by the inner sleeve and extending parallel to and spaced from the longitudinal axis.

A preferred method of producing a single piece connector includes the step of inserting a piece of stock into a multi-head lathe. The stock is rotated about its center of rotation. An interior opening is drilled in the stock concentric with the center of rotation of the stock. The outer surface of the stock is turned to a finished surface including forming a flange. The flange is squared. A plurality of attachment holes in the flange parallel and spaced from the center of rotation of the stock are drilled. Threads are formed on the outer surface of the stock. The finished piece of the stock is separated from the stock to form the connector body.

BRIEF DESCRIPTION OF THE DRAWINGS

For the purpose of illustrating the invention, the drawings are of forms which are presently preferred; it being understood, however, that this invention is not limited to the precise arrangement and instrumentality shown.

DESCRIPTION OF THE INVENTION

Figure 1:
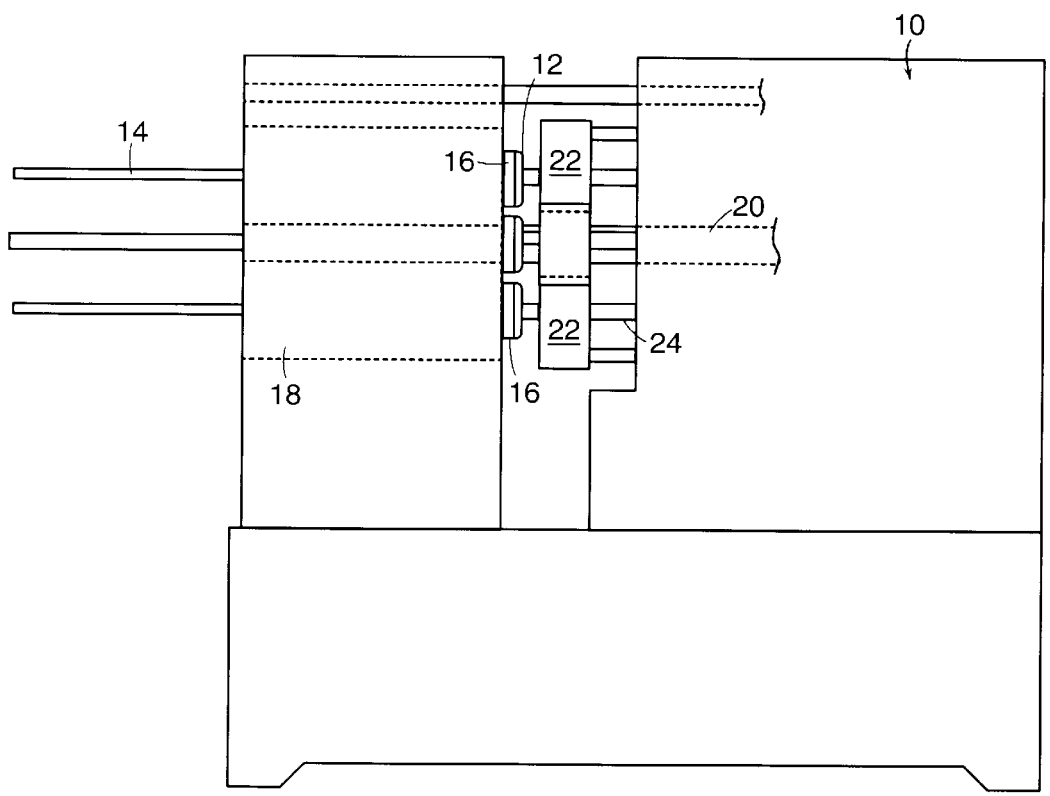
FIG. 1 is a side view of a multi-spindle lathe used in the method described in this invention.

Referring to the drawings in detail, wherein like numerals indicate like elements and where primes indicate counterparts of such like elements, there is illustrated a multi-spindle lathe 10 with attachments in accordance with the present invention.

Figure 2:
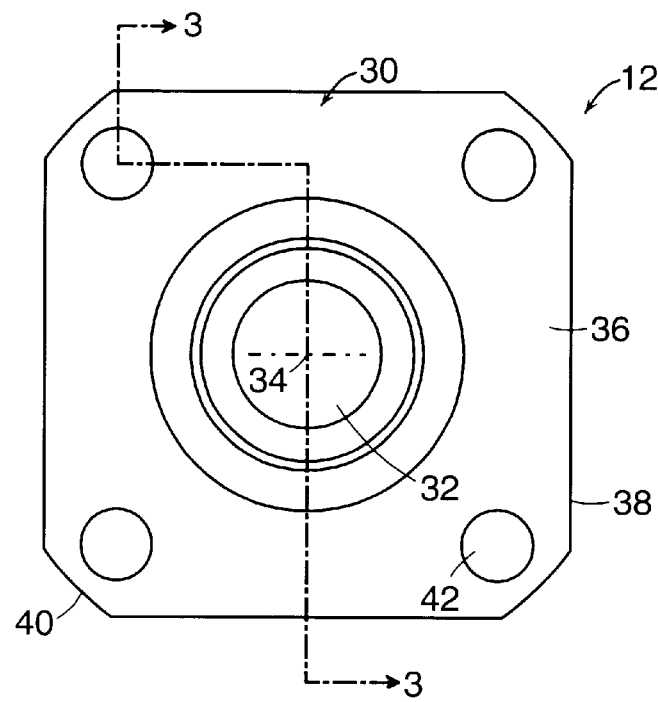
FIG. 2 is a rear view of a connector manufactured by the process claimed in the invention.
Figure 3:
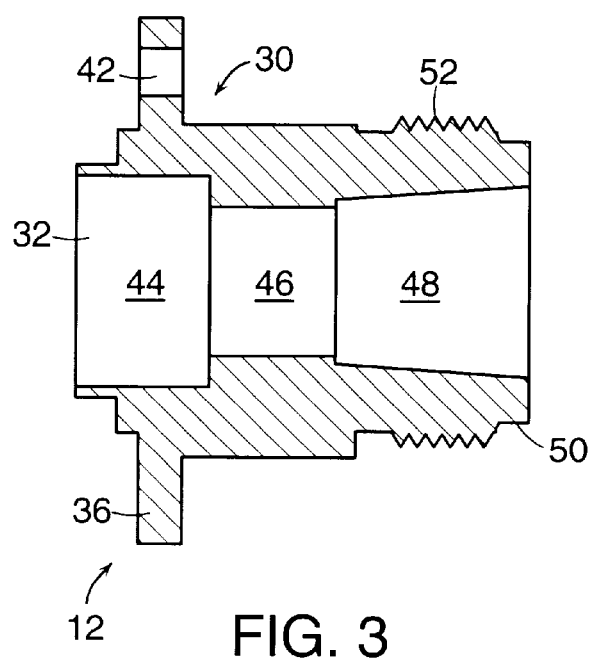
FIG. 3 is a cross-sectional view of the connector.

Referring to FIG. 1, the multi-spindle lathe 10 is used to prepare a machined part or component 12, such as a connector shown in FIGS. 2 and 3, from a piece of bar stock on workpiece 14. The multi-spindle lathe has a plurality of spindles 16 which each receive a piece of bar stock or workpiece 14. Each spindle 16 rotates at a rate of approximately 1,500 to 2,000 rpm (revolution per minute), rotating the bar stock 14 at the same speed. While each piece of bar stock 14 is typically several feet in length when initially installed, the multi-spindle lathe 10 is working only on the last few inches of the stock to produce the part 12. The bar stock 14 is fed after the part 12 is removed so that a new part 12 can be manufactured from a portion of the remaining bar stock.

The spindles 16, in addition to rotating individually, rotate as a unit with an indexing drum 18 such that the spindles 16 can each move to set positions or stations. The rotation of the indexing drum 18 is accomplished by an central shaft 20. At each position, there is a set of slides 22, a cross slide and an end slide, to which tools or attachments may be attached to perform various operations on the stock material 14. The cross slide moves in and out in a radial direction relative to the spindle. The end slide moves in and out in an axial direction relative to the spindle. Both slides 22 are powered and controlled using a shaft 24 and a series of cams to do at least one of the following: rotate a portion or all of the attachment, or move a portion or all of the attachment relative to the bar stock and spindle.

The multi-spindle lathe 10 as described above is well known in the art. A preferred embodiment of the multi-spindle lathe 10 has independent cams for each slide and for each station. Manufacturers and/or distributors of such or similar lathes include Acme Gridley, New Britain of Connecticut, Conomatic of Vermont, Davenport of New York, Tornos Bechler of Switzerland and ZPS of Chechoslovak.

Referring to FIG. 2, the multi-spindle lathe 10 with attachment in accordance with the present invention can produce a variety of parts or components 12 such as a connector body 30. The connector 30 shown is for a panel receptacle. The connector 30 is predominantly cylindrical in shape having an opening 32 extending along a center line 34 (a center of rotation). The connector 30 has a flange 36 with four edges 38 and chamfered corners 40, if desired. A hole 42 is located in proximity to each of the corners 40. Each hole 42 is spaced from the center of rotation 34 of the connector 30 (i.e., part 12) and parallel to the center of rotation 34. The holes 42 are used in securing the connector 30 to a panel.

Referring to FIG. 3, the opening 32 of the connector 30 is defined by a variety of inner diameters including a rear inner diameter 44, a narrow center diameter 46, and an insert-receiving forward tapered area 48. Located in proximity to a forward edge 50, the right side in FIG. 3, is a series of threads 52 to receive a threaded nut of a mating connector, is made from another piece of stock. A portion of one of the holes 42 in the flange 36 is shown.

In that each piece of stock 14 is rotated from station to station, (i.e., position to position)on the multi-spindle lathe 10, the station which takes the longest time to complete its operation dictates the total time frame of the operation. At each station, either the cross slide or the end slide can contain an attachment to perform an operation or both slides can have attachments. It may be desired to perform similar operations at several stations to transform the stock into the finished piece. While a station can be empty and not perform an operation, in that the stock has to spend a set time at each station, based on the longest operation time, it is generally desirable to split the longest station into two stations and fill all stations, therefore decreasing the overall time to complete the part.

Figure 4:
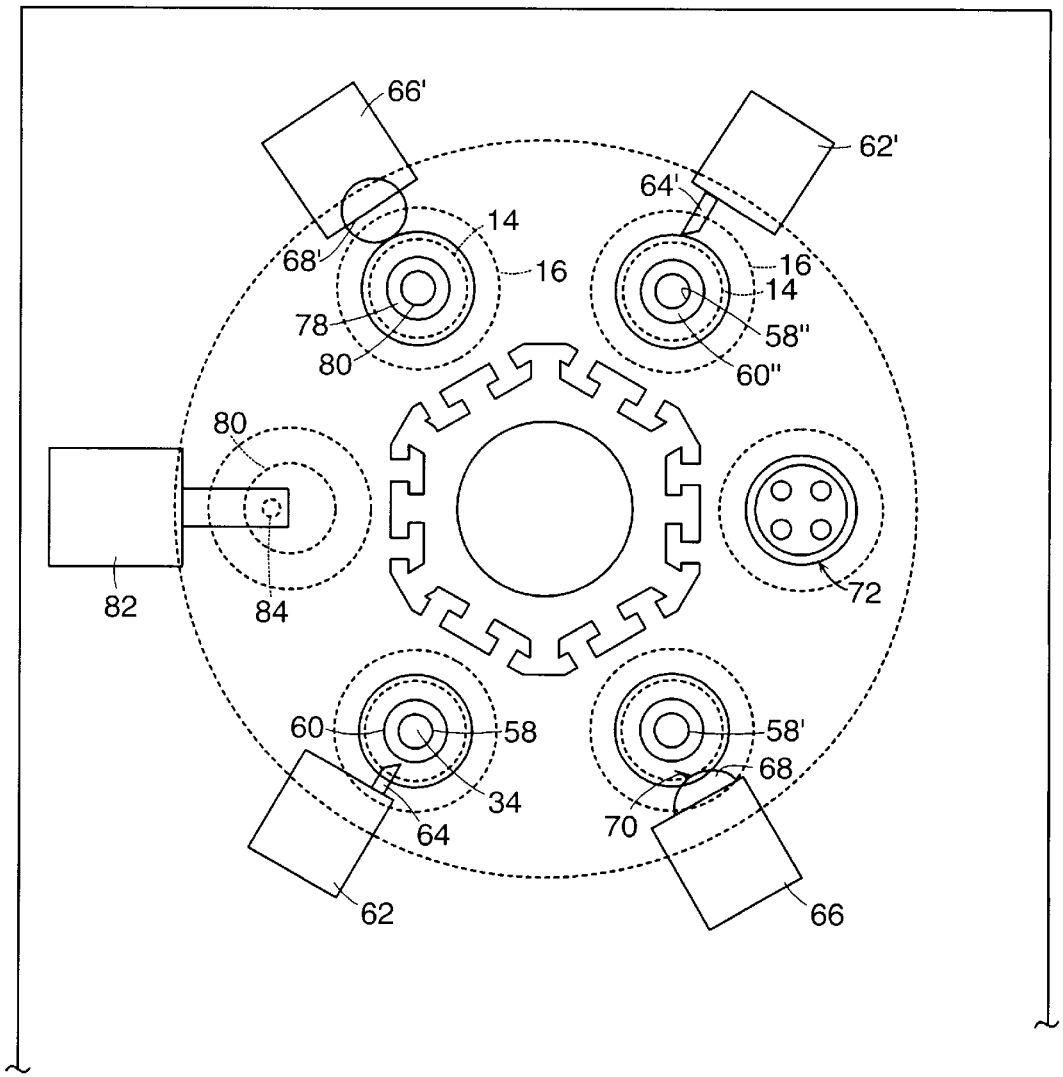
FIG. 4 is a schematic sectional view of the multi-spindle lathe showing the attachments taken along line 4—4 of FIG. 1. The stock material is shown in phantom.
Figure 5:
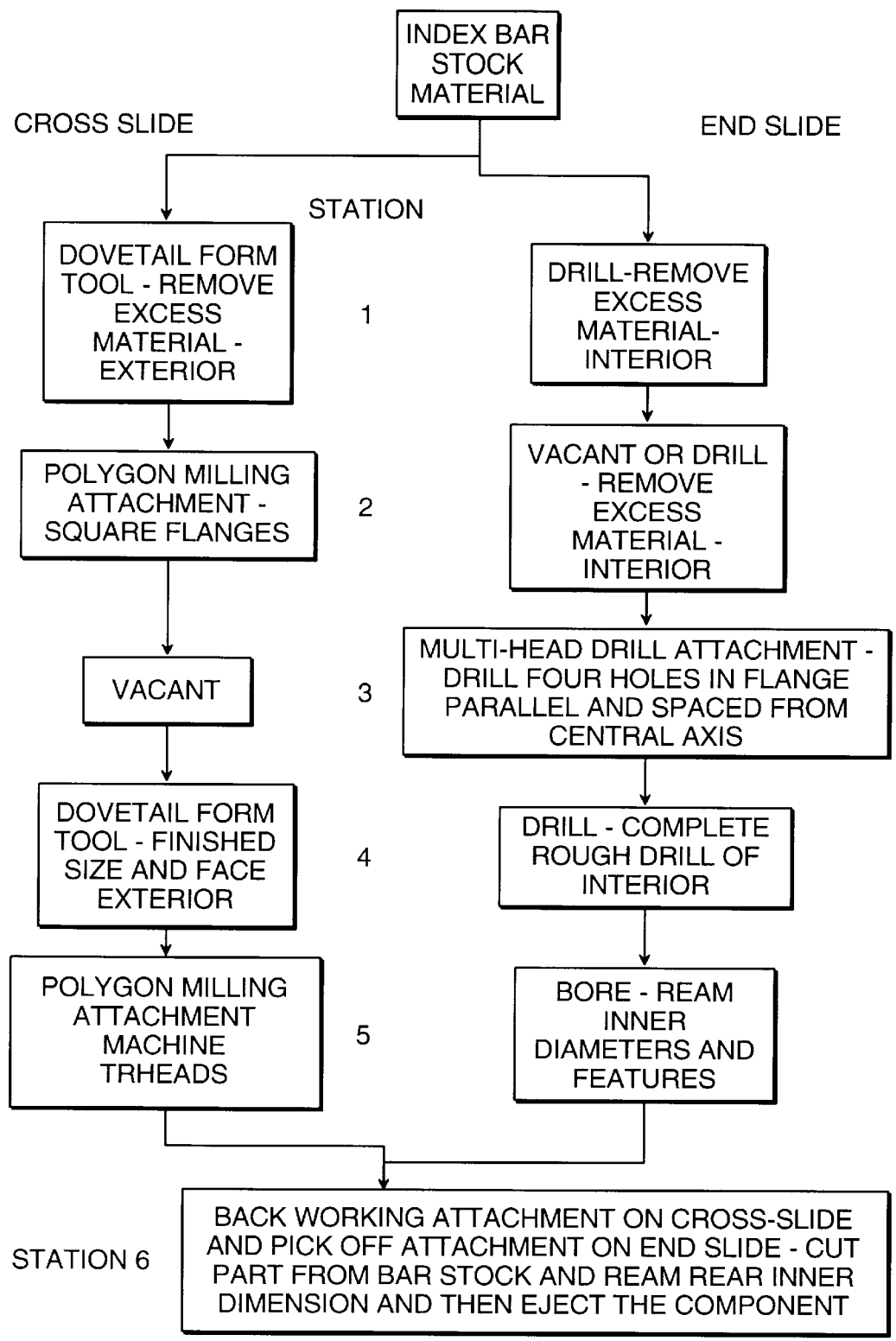
FIG. 5 is a chart showing the process of manufacturing the connector.

Referring to FIG. 4 which shows a schematic of the attachments of the multi-spindle lathe 10, and FIG. 5 which outlines the various operations to manufacture the component 12 shown in FIGS. 2 and 3, an n-type panel receptacle connector 30. The spindles 16 and the bar stock 14 are shown in phantom in FIG. 4. It is recognized that certain of these operations can be altered in their position and still achieve the final part. The connector 30 described is just an example and it is recognized that other machined components 12 can be made using the described machinery and processes.

In the first station, the opening 32 extending along the center line 34 (the axis of rotation) of the connector 30/bar stock 14 (refer to FIGS. 2 and 3 for the connector) is drilled to a rough diameter using a carbide twist drill bit 58. The drill bit 58 rotates in the opposite direction as the bar stock. The drill bit is part of a drill head 60 which is attached to the end slide and moves translationally (axially) along the axis of rotation defining the center line 34 of the bar stock 14 and the spindle of the station.

While the drill bit 58 is rough drilling the opening 32, a second tool or attachment is carried on the cross slide of the first station. The cross slide has a dovetail attachment 62 having a dovetail form tool 64 which is moved radially inward and removes material by cutting (chipping). The cross slide continues to move inward removing material until the desired rough shaped is achieved. The cross slide moves outward prior to the index drum 18 rotating and the next piece of bar stock 14 being in position for the same operation. Drill head and the dovetail attachment are typically purchased from the supplier of multi-spindle lathe 10.

In the second station, the cross slide has a polygon milling attachment 66. The polygon milling attachment 66 has a cylindrical cutting tool 68. The cylindrical cutting tool 68 rotates at a speed equal to or some integral of the speed of the rotating bar stock 14, such as twice the speed of the rotating stock. The cutting tool 68 has at least one knife cutting surface 70, and preferable two knife cutting surfaces, which projects outward from the remainder of the rotating cylinder which removes material only from a portion of the rotating bar stock 14. The rotation of the cutting tool 68 at a speed which synchronizes with the rotating stock 14 results in creating the four edges 38 of the flange 36. The location of the material prior to the polygon milling attachment is shown in phantom for one edge 38. The polygon milling attachments are known in the art. Manufacturers and/or distributors of polygon milling attachments include Sacco Inc. and Tools System Engineering (TSE) both of Italy.

The end slide of the second station can be left vacant or can have a second carbide twist drill bit 58' for doing additional rough drilling of the opening 32.

In the third station, the cross slide is left vacant and the end slide has a multi-head drill attachment 72 for drilling the four holes 42 at four working sites in the flange 36. The multi-head drill attachment 72 will be explained in greater detail below after the remaining stations are briefly described.

In the fourth station, the cross slide has a dovetail attachment with a dovetail form tool 62' which is moved radially inward and removes material. The dovetail is similar to that described in the first station, but rather than moving in to create a rough outer diameter, the dovetail gives a finished form of the outside diameter of the connector 30/ bar stock 14. The cross slide continues to move inward removing material and then moves outward prior to the indexing drum 18 rotating and the next piece of bar stock 14 being in position for the same operation.

While the dovetail form tool 62' carried by the cross slide is finishing the outer diameter in station four, the end slide has another drill head 60" for removing more material from the opening 32 of the connector.

In a preferred embodiment, there are drilling operations at several stations since drilling is a time consuming operation. In addition, as indicated above, since the stock 14 stays at each station same amount of time and the station which takes the longest time to complete its operation dictates the total time frame of the operation, it may be desired to perform drilling operations at several stations.

In the fifth station, the cross slide has a polygon milling attachment 66'. The polygon milling attachment 66' has a circular milling tool to create the threads on the connector. It is recognized that a roll formed attachment can be used in place of the polygon milling attachment to machine the threads. The end slide has a bore attachment 78 with a bore tool 80 for counterboring the inner diameters. The bore is held stationary and the bar stock 14 rotates; In finishing operations the bore or drill bit typically is held stationary and the stock is rotated.

The sixth and final station has a back working attachment 82 on the cross slide and a pick-off attachment 84 on the end slide. The component 12, the connector 30, is cut from the rest of the bar stock 14 by a cutter 86 attached to the cross slide. The cross slide in the sixth station is a split cross slide capable of preforming two operations. The pick-off attachment carried by the end slide supports the connector 30 and rotates the connector 30 at the same speed and direction as the spindle had, while the back working attachment reams the rear inner dimension, as seen in FIG. 3, to the proper size. The back working attachment has a drill bit that is held stationary, similar to the bore in the fifth station, as the connector 30 is rotated by the pick-off attachment. When the connector 30 is completed, the pick off attachment 84 ejects the completed component into a chute or onto a conveyor. Similar to drill heads and the dovetail attachments, back working attachments and pick-off attachments are typically purchased from the supplier of multi-spindle lathe 10.

The bar stock 14 from which the completed connector 30 has been removed from is fed outward so another part can be machined. The indexing drum 18 rotates this bar stock 14 and respective spindle 16 on to the first station. During operation the multi-spindle lathe 10 has a piece of bar stock 14 at each station. The connector 30 is formed on a single piece of bar stock and includes holes that are parallel to and spaced from the axis of rotation, without having to install the connector 30 on an additional machine to the multi-spindle lathe.

Figure 6:
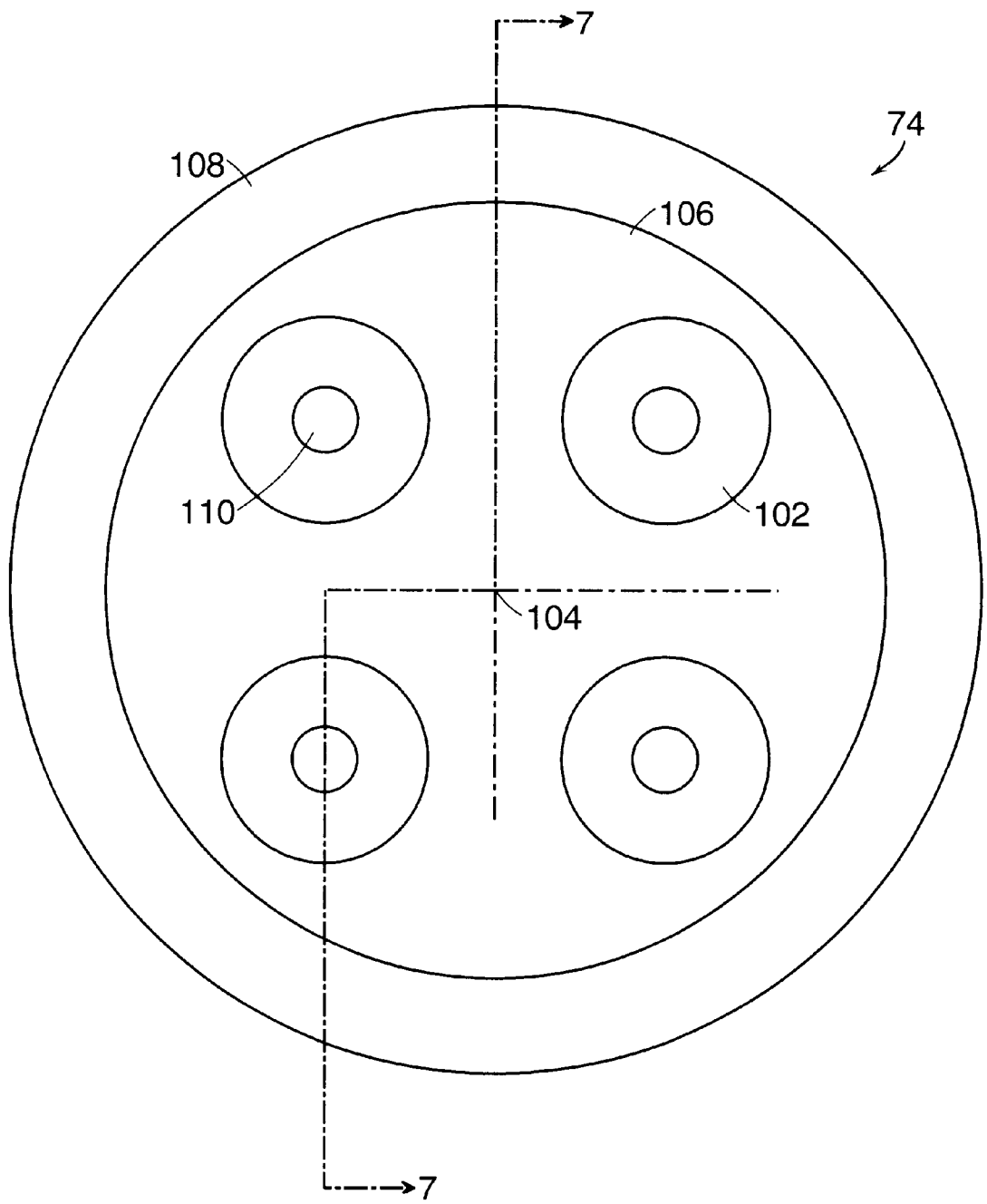
FIG. 6 is a front view of a multi-head drill according to the invention.

Referring to FIG. 6, the multi-head drill attachment 74 has four drill heads 102 spaced from a central axis of rotation 104. The drill heads 102 are mounted on an inner hub or sleeve 106 which rotates relative to an outer stationary hub or sleeve 108. The drill heads 102 each contain a rotating drill bit 110.

Figure 7:
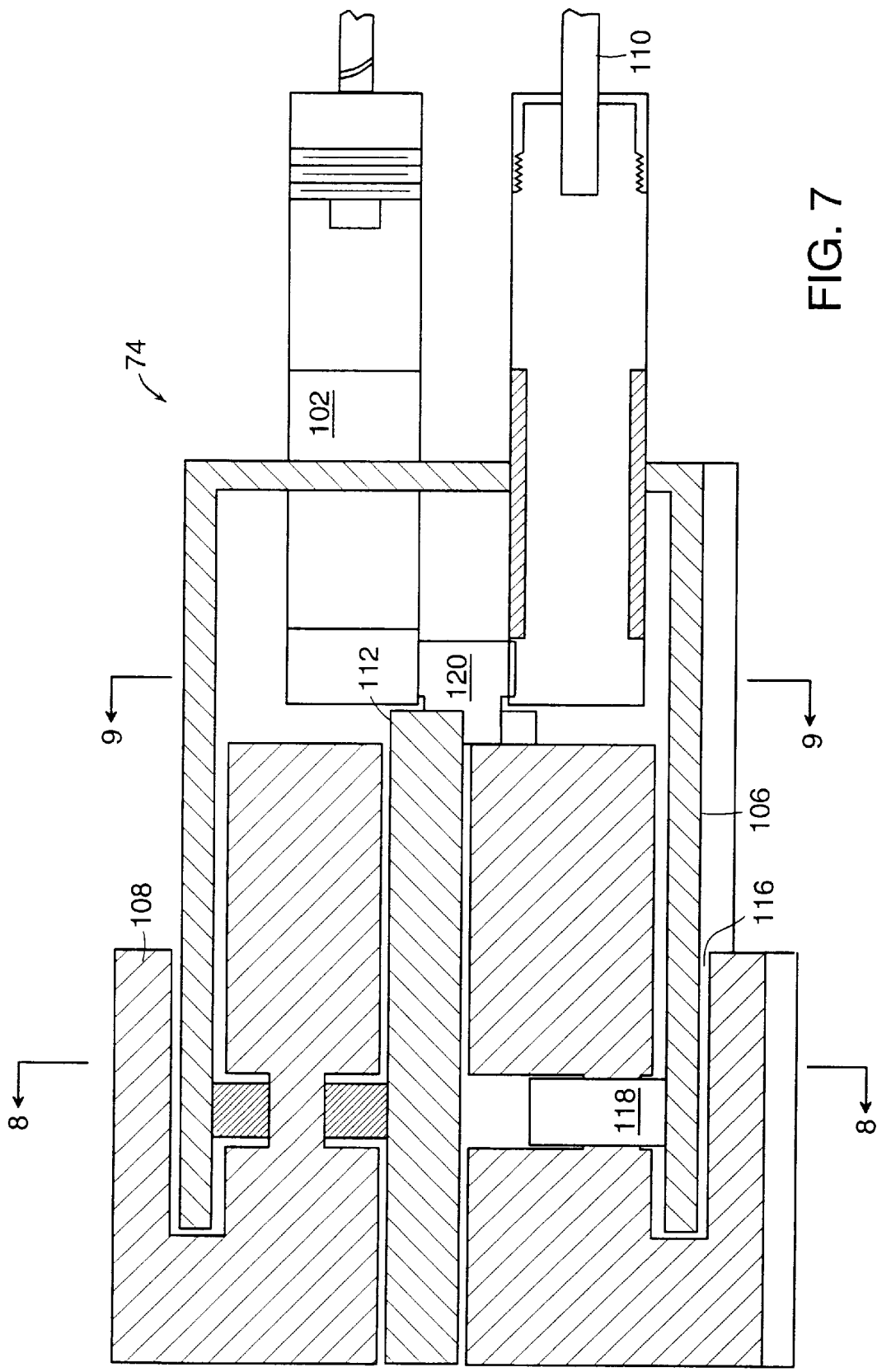
FIG. 7 is a cross-section taken along the line 7—7 of FIG. 6.

FIG. 7 shows a sectional view of the multi-head drill attachment 74. A drive shaft 112 extends through the outer stationary hub 108 from an attachment with a rotating shaft in the multi-spindle lathe 10. The inner hub 106 is rotatably mounted in a groove 116 in the outer stationary hub 108. The multi-head drill attachment 74 has a gearing arrangement 118 which rotates the inner hub 106 such that the inner hub 106 rotates in synchronized movement with the rotating stock 14, therefore the inner hub and stock have no relative rotation to each other.

The drill heads 102 are mounted on the inner hub 106 and rotate with the inner hub 106 around the center axis 104 defined by the drive shaft 112. In addition the drill bits 110 rotate relative to the inner hub 106. A second gearing arrangement 120 rotates the drill bits 110 in the same direction as the drive shaft 112, but at a faster revolution than the inner hub 106. In that the inner hub 106 has no relative rotation to the flange 36 of the stock 14, the direction of rotation of the drill bits 110 is dependent on whether the drill bit is right handed or left handed.

Figure 8:
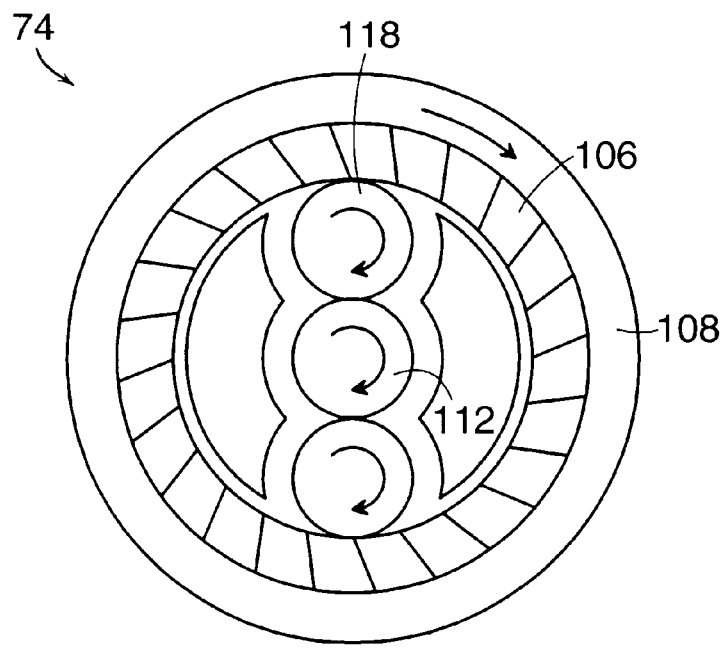
FIG. 8 is a cross-sectional view taken along the line 8—8 of FIG. 7.

A representation of the drive shaft rotating the gearing arrangement which rotates the inner hub with the drill heads, not shown in this Figure, is shown in FIG. 8. If the drive shaft is rotating in the clockwise direction, the inner hub also rotate in the clockwise direction. A portion of the stationary outer hub is located between the drive shaft and the inner hub for stiffness.

Figure 9:
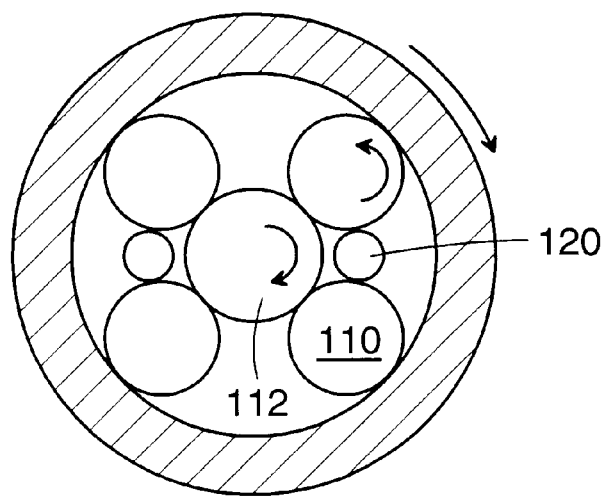
FIG. 9 is a cross-sectional view of the multi-head drill taken along the line 9—9 of FIG. 7.

A representation of the drive shaft rotating the gearing arrangement which rotates the individual drill heads is shown in FIG. 9. If the drive shaft is rotating in the clockwise direction, the drill head also rotates in the clockwise direction. A portion of the stationary outer hub is located between the drive shaft and the inner hub for stiffness.

It is recognized that if an eight station multi-spindle lathe is used, the operations could be expanded from six stations to eight stations. For example, two multi-head drill attachments each with two drill heads could be used.

With the addition of the multi-head drill to the multi-spindle lathe 10, the multi-spindle lathe 10 is capable of drilling holes at working sites parallel to and spaced from the axis of rotation of the rotating bar stock.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

I claim:

1. A method of making a single piece connector comprising the following steps:

inserting a piece of stock into a multi-head lathe;

rotating the stock about a center of rotation of the stock;

turning the outer surface of the stock to form an outer surface including a flange; and drilling a plurality of attachment holes in the flange using the multi-head lathe, while the stock, including a flange, rotates, at least one of the attachment holes spaced from the center of rotation of the stock.

2. The method of claim 1 further comprising the steps of drilling an interior opening in the stock concentric with the center of rotation of the stock; and separating a finished piece of the stock from the stock to form the connector.

3. The method of claim 1 further comprising driving each head of the lathe with a common drive shaft.

4. The method of claim 1 further comprising forming a connector body.

5. A method of making a single piece coaxial connector body of a N-type connector comprising the following steps:

inserting a piece of stock into a multi-head lathe;

rotating the stock about a center of rotation of the stock;

drilling an interior opening in the stock concentric with the center of rotation of the stock;

turning the outer surface of the stock to a finished surface including forming a flange;

squaring the flange; and drilling a plurality of attachment holes in the flange parallel and spaced from the center of rotation of the stock using the multi-head lathe, while the stock and flange rotate.

6. The method of claim 5 further comprising the steps of turning the outer surface of the stock to a rough surface concurrently with the drilling of the interior opening;

forming threads on the outer surface of the stock; and separating the finished piece of the stock from the stock to form the coaxial connector body of the N-type connector.

7. A method of making a single piece connector body comprising the following steps:

inserting a piece of stock into a multi-head lathe;

rotating the stock about a center of rotation of the stock;

turning the outer surface of the stock to form an outer surface including a flange; and drilling a plurality of attachment holes in the flange, while the stock and flange rotate, at least one of the attachment holes spaced from the center of rotation of the stock, by rotating an attachment to the lathe about a rotational axis of the attachment and rotating at least one drill bit of the attachment spaced from the rotational axis of the attachment.

8. The method of claim 7 further comprising the steps of drilling an interior opening in the stock concentric with the center of rotation of the stock; and separating a finished piece of the stock from the stock to form the connector.

9. A method of making a single piece connector body comprising the following steps:

placing a piece of stock into a spindle;

rotating the stock about a central axis of rotation at a first angular velocity;

turning the outer surface of the stock to form an outer surface including a flange;

providing a cutting tool mounted in an end slide, the central axis of the cutting tool unaligned with the central axis of the end slide;

rotating the end slide about a second axis at an angular velocity equivalent to that of the rotating stock;

rotating the cutting tool at a second angular velocity; and using the cutting tool to drill a plurality of attachment holes in the flange while the stock and flange rotate, at least one of the attachment holes spaced from the central axis of rotation of the stock.

* * * * *